(12) United States Patent
Biziitu et al.

(10) Patent No.: US 10,193,449 B2
(45) Date of Patent: Jan. 29, 2019

(54) BUCK VOLTAGE CONVERTER

(71) Applicant: Infineon Technologies AG, Neubiberg (DE)

(72) Inventors: Florin Biziitu, Bucharest (RO); Ansgar Pottbaecker, Grafing (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/633,098

(22) Filed: Jun. 26, 2017

(65) Prior Publication Data
US 2018/0375434 A1 Dec. 27, 2018

(51) Int. Cl.
*H02M 3/156* (2006.01)
*H02M 3/158* (2006.01)
*G05F 1/577* (2006.01)
*H02M 3/335* (2006.01)
*H02P 8/12* (2006.01)
*H02M 1/44* (2007.01)

(52) U.S. Cl.
CPC .......... *H02M 3/1582* (2013.01); *G05F 1/577* (2013.01); *H02M 1/44* (2013.01); *H02M 3/158* (2013.01); *H02M 3/1588* (2013.01); *H02M 3/33507* (2013.01); *H02P 8/12* (2013.01)

(58) Field of Classification Search
CPC .................................. G05F 1/56; G05F 1/575
USPC ....... 323/242, 243, 272, 274, 280, 284, 286, 323/288, 315, 316
See application file for complete search history.

(56) References Cited

U.S. PATENT DOCUMENTS

| 5,373,226 | A | * | 12/1994 | Kimura | G05F 3/245 323/313 |
| 2007/0090821 | A1 | * | 4/2007 | Imai | H02M 1/32 323/284 |
| 2009/0284235 | A1 | * | 11/2009 | Weng | H02M 3/156 323/222 |
| 2011/0254526 | A1 | * | 10/2011 | Luo | H02M 3/1584 323/284 |
| 2012/0306465 | A1 | * | 12/2012 | Suga | H02M 3/156 323/282 |
| 2015/0372613 | A1 | * | 12/2015 | Houston | H02M 3/158 307/31 |
| 2016/0087595 | A1 | * | 3/2016 | Gopalraju | H02M 3/158 323/271 |
| 2016/0164412 | A1 | * | 6/2016 | Li | H02M 3/1588 323/299 |

OTHER PUBLICATIONS

"DC-DC Converters Feedback and Control," ON Semiconductor, accessed from www.onsemi.com on Jun. 2, 2017, 79 pp.
Tucker, J., "Understanding output voltage limitations of DC/DC buck converters," Analong Applications Journal, Texas Instruments Incorporated, accessed from www.ti.com/aaj, 2008, 4 pp. (Applicant points out, in accordance with MPEP 609.04(a), that the year of publication, 2008, is sufficiently earlier than the effective U.S. filing date, Jun. 26, 2017 so that the particular month of publication is not in issue.)

* cited by examiner

*Primary Examiner* — Gary Nash
(74) *Attorney, Agent, or Firm* — Shumaker & Sieffert, P.A.

(57) ABSTRACT

A buck voltage converter is provided which is configured so that a dominant pole of an open loop transfer function of the buck voltage converter is a pole introduced by a network comprising an inductor and a capacitor coupled to an output of the buck voltage converter.

16 Claims, 6 Drawing Sheets

BUCK VOLTAGE CONVERTER

TECHNICAL FIELD

The present application relates to buck converters and to associated methods.

BACKGROUND

Voltage converters like buck converters are generally used to provide an output voltage based on an input voltage. For example, voltage converters may be used internally in electronic circuits to generate one or more internal supply voltages based on an external supply voltage. Voltage converters may be regulated using feedback loops to provide a predefined regulated output voltage or a predefined regulated output current.

Such regulated voltage converters, also referred to as voltage regulators herein, are used in a variety of systems and devices, for example in microcontrollers or microprocessors, to generate stable supply voltages.

Current microcontrollers or microprocessors, to give an example, constitute highly dynamic loads for voltage regulators that supply them. Highly dynamic means that the requirements regarding a current to be supplied via the voltage regulator may change rapidly. For example, during a system boot or wakeup sequence, i.e. during startup of system or waking up the system from a low power mode, an average current that has to be provided to such a microprocessor or microcontroller may jump from values of less than 10 microamperes to hundreds of Milliamperes in less than 5 microseconds.

Furthermore, in some applications, for example in the automotive environment, a supply voltage provided as input voltage to the voltage converter may vary significantly, for example from less than 5.5 Volt to 13.5 Volt during cranking or from 13.5 Volt to 28 Volt or more during jump start or load dump events. Therefore, voltage regulators used in such environments need to be precise and fast in order to avoid problems like a system reset or electrical overstress of the supply microprocessor.

SUMMARY

According to an embodiment, a buck voltage converter is provided, comprising:
a voltage input terminal,
a voltage output terminal,
a switch arrangement coupled to the voltage input terminal, the switch arrangement comprising a switch controller,
a feedback loop coupled between the voltage output terminal and the switch controller, and
a network comprising an inductor and a capacitor coupled to the voltage output terminal,
wherein the buck voltage converter is configured so that a dominant pole of an open loop transfer function of the buck voltage converter is a pole introduced by the network.

According to a further embodiment, a buck voltage converter is provided, comprising:
a voltage input terminal,
a voltage output terminal,
a voltage converter circuit coupled between the voltage input terminal and the voltage output terminal, wherein the voltage converter circuit comprises:
a switch arrangement, and
an error amplifier having a high pass filter characteristic, wherein a first input of the error amplifier is configured to be coupled to a reference voltage, wherein a second input of the error amplifier is coupled to the voltage output terminal, and wherein an output of the error amplifier is coupled to the switch arrangement; and
a network comprising a capacitor and an inductor coupled to the voltage output terminal.

According to yet another embodiment, a method is provided, comprising:
providing a voltage input terminal,
providing a voltage output terminal,
providing a switch arrangement between the voltage input terminal and the voltage output terminal,
coupling a network including an inductor and a capacitor to the voltage output terminal,
providing a feedback loop between the voltage output terminal and a switch controller of the switch arrangement, and
configuring a buck voltage converter including the switch arrangement, the network and the feedback loop such that a dominant pole of an open loop transfer function of the buck voltage converter is introduced by the network.

The above summary is merely intended to give a brief overview over some aspects and is not to be construed as limiting in any way. For example, other embodiments may comprise other features than the ones recited above.

DETAILED DESCRIPTION

Figure 1:
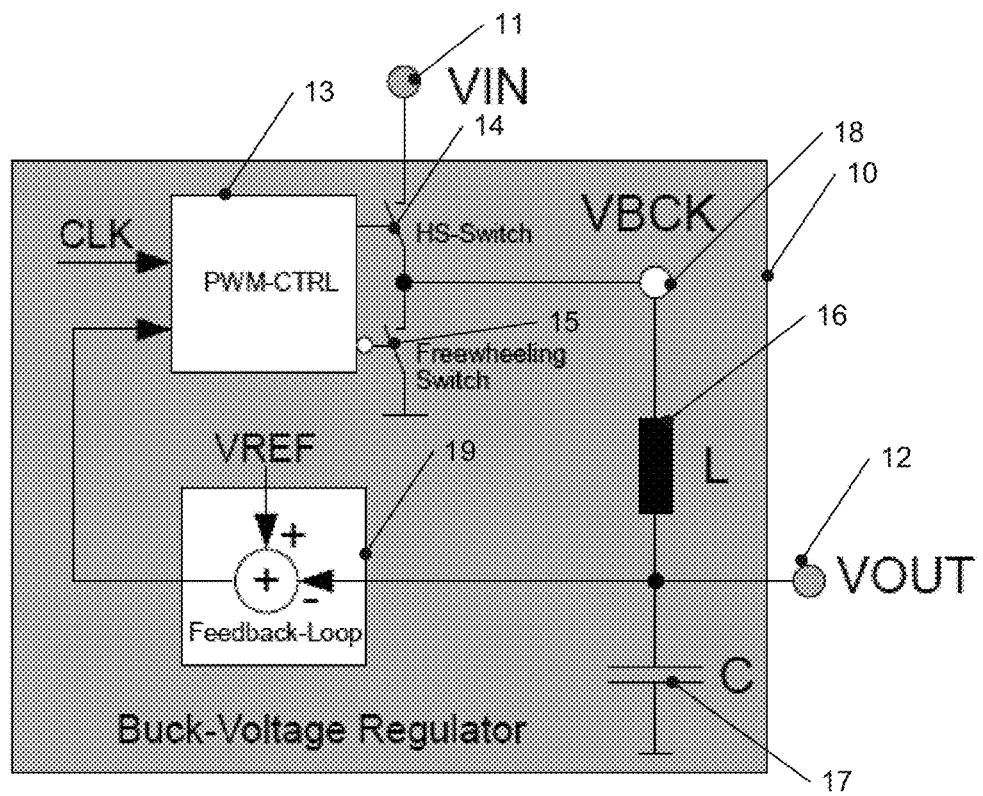
FIG. 1 is a block diagram of a regulated buck voltage converter according to an embodiment.

In the following, various embodiments will be described referring to the attached drawings. It should be noted that these embodiments are given by way of example only and are not to be construed in a limiting sense. For example, while some embodiments are described and shown as comprising a plurality of features or elements, this is not to be construed as indicating that all those features or elements are necessary for the implementation of embodiments. Instead, in other embodiments, other features or elements than the ones explicitly shown and described may be provided.

Features or elements from different embodiments may be combined unless specifically noted otherwise. Variations and modifications described with respect to one of the embodiments may also be applied to other embodiments.

In the embodiments shown and described, direct electrical connections shown in the drawings or described herein, i.e. connections comprising no additional intervening elements (for example simple wire connections or metal path connections) may be replaced by indirect connections or couplings, i.e. connections or couplings comprising one or more additional intervening elements, and vice versa, as long as the purpose of the connection or coupling, for example to transmit a certain kind of signal, to transmit a certain kind of information or to provide a certain kind of control, is essentially maintained. In other words, electrical connections or couplings may be modified as long as the operation of the electrical connection or coupling is essentially unaffected.

Embodiments described herein relate to buck converters. A buck converter is a DC (direct current) to DC power converter which steps down voltage from an input voltage provided to its input terminal to an output voltage provided at its output terminals. Buck converters are a type of switched mode power supplies. Some embodiments relate to regulated buck converters (also referred to as buck regulators) which use a feedback to regulate the output voltage. In particular, embodiments relate to buck converters operated in voltage mode control, where the feedback is based on the output voltage.

Buck regulators inter alia may be characterized by their open loop transfer function. The open loop transfer function basically describes the output signal divided by the input signal, taking both amplitude and phase into account. The open loop transfer function will sometimes be depicted herein by providing an open loop gain function and an open loop phase function separately. In the s plane (transferred from the time domain to the s domain by a Laplace transform) open loop transfer functions inter alia may be characterized by their poles and zeros. The term dominant pole refers to the pole having the lowest frequency.

Poles generally cause a phase decrease of the output signal, which may be fully or partially compensated by a zero of the open loop transfer function.

Turning now to the figures, FIG. 1 illustrates a regulated buck voltage converter 10 according to an embodiment. The voltage converter of FIG. 1 includes a voltage input terminal 11 to receive an input voltage VIN and a voltage output terminal 12 to output an output voltage VOUT. Input terminal 11 is coupled to a switch arrangement comprising a high-side switch 14 and a freewheeling switch 15. Freewheeling switch 15 may be implemented as a dedicated low-side switch 15 in some embodiments, but in other embodiments may also be implemented as a freewheeling diode. The switch arrangement further comprises a switch controller 13. In the embodiment of FIG. 1, switch controller 13 is a pulse width modulation (PWM) controller which controls high-side switch 14 and, if provided, low-side switch 15 according to a pulse width modulation scheme, wherein a pulse width determines an on-time of high-side switch 14, i.e. a time during which high-side switch 14 is closed. In some embodiments, switch controller 13 controls high-side switch 14 (and optionally low-side switch 15, if provided) according to a constant frequency pulse width modulation scheme based on a clock signal CLK. This essentially means that a sum of on-time and off-time of high-side switch 14 remains essentially constant, defining a constant period length corresponding to a constant frequency.

A node between high-side switch 14 and freewheeling switch 15 is coupled to a switch output terminal 18. VBCK denotes a voltage at this terminal. An inductor 16 having an inductivity L is coupled between switch output terminal 18 and output terminal 12, and a capacitor 17 having a capacitance C is coupled between output terminal 12 and ground. While a single inductor 16 and a single capacitor 17 are shown in FIG. 1, in other embodiments, other combinations of inductors and capacitors may be used. Generically, a circuit comprising an inductor and a capacitor coupled to the output terminal of the voltage regulator will be referred to as LC network herein. This LC network essentially stores energy when high-side switch 14 is closed and releases energy to output terminal 12 when high-side switch 14 is open. In this respect, operation of the buck converter of FIG. 1 corresponds to conventional buck converters. A feedback loop 19 is provided from output terminal 12 to an input of switch controller 13. In feedback loop 19, as schematically shown, the output voltage VOUT or a quantity derived therefrom is compared to a reference voltage VREF, and a difference is provided to switch controller 13. In this way, a voltage mode regulation of the output frequency VOUT depending on the reference frequency VREF is provided.

In many implementations, inductor 16 and capacitor 17 may be implemented as discrete components, while the remaining components of buck converter 10 may be implemented as a single integrated circuit. In other embodiments, separate integrated circuits or discrete components may be used for implementing buck converter 10.

In embodiments, the components of buck converter 10 are designed such that a dominant pole of the open loop transfer function is introduced by the LC network including inductor 16 and capacitor 17 coupled to output terminal 12.

The pole introduced by the LC network in embodiments is a double conjugate complex pole.

Figure 2:
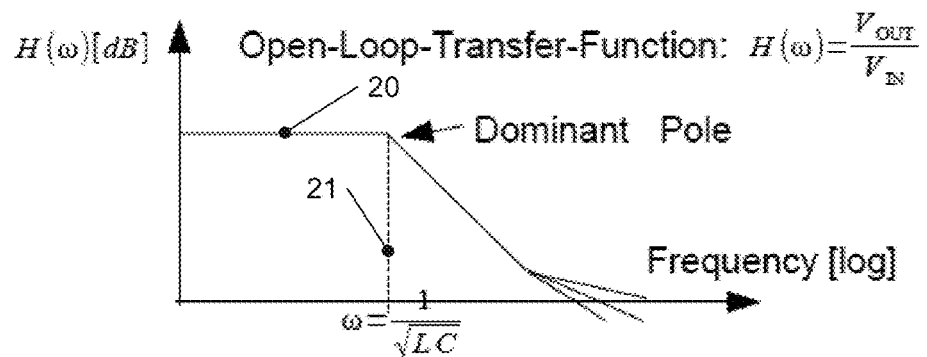
FIG. 2 is a diagram schematically illustrating an open loop transfer function of a regulated buck voltage converter according to an embodiment.

In the simple example with inductor 16 and capacitor 17 of FIG. 2, the angular frequency ω of the pole introduced by the LC network is $$\omega = \frac{1}{\sqrt{LC}}.$$

This is schematically shown in FIG. 2, which illustrates a schematic open loop transfer function 20 (corresponding to the output voltage VOUT divided by the input voltage VIN) over frequency on a logarithmic scale. As can be seen, above the dominant pole marked by a dashed line 21, the open loop transfer function decreases with frequency.

Such an open loop transfer function with a dominant pole introduced by the LC network differs from some conventional solutions, where in buck converters a dominant pole is designed to be at low frequencies, in particular at a lower frequency than the pole introduced by the LC network. In contrast thereto, in embodiments discussed herein as mentioned the dominant pole is introduced by the LC network.

In embodiments, this decreases a response time of the buck converter or, in other words, increases the speed of regulation of the buck converter.

Therefore, a fast response time to load variations (i.e. output current variations at terminal 12) and/or to variations of the input voltage VIN may be provided.

In embodiments, in addition to designing the circuit such that the dominant pole is introduced by the LC network, at least one additional zero is provided in the transfer function to mitigate the phase decrease introduced by this dominant pole. In some embodiments, this increases the available bandwidth, may improve stability and/or may decrease the response time further. Examples for such an additional zero will be discussed below in more detail.

Figure 3:
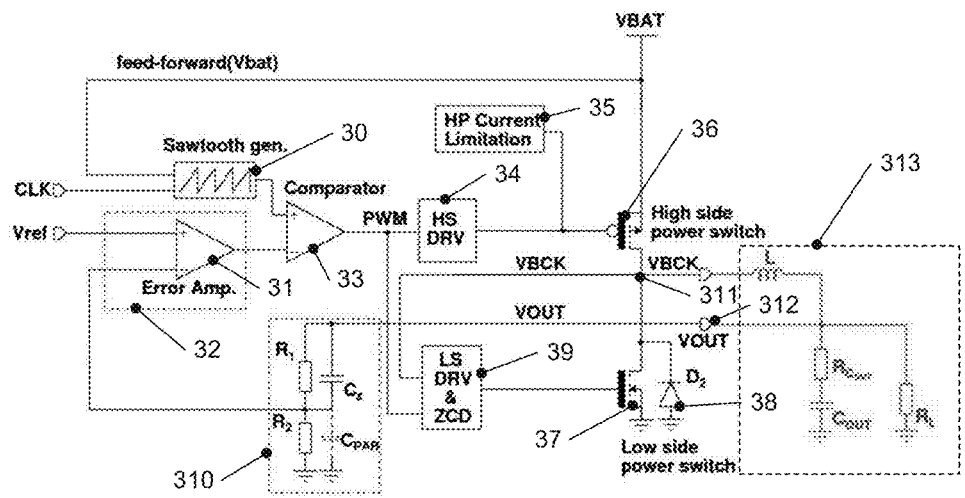
FIG. 3 is a diagram illustrating a regulated buck voltage converter according to an embodiment.

FIG. 3 is a diagram illustrating a buck regulator according to a further embodiment.

In the embodiment of FIG. 3, the buck converter receives a battery voltage VBAT as an example for an input voltage, for example a battery voltage in an automotive environment. Furthermore, the buck converter of FIG. 3 outputs an output voltage VOUT. The buck converter of FIG. 3 comprises a switch arrangement comprising a high-side power switch 36 and a low-side power switch 37. Freewheeling diode 38 is coupled in parallel to low-side power switch 37. Switches 36, 37 in the example of FIG. 3 are implemented as MOS transistors. In some MOS transistor implementations, diode 38 may be an inherent diode of low-side power switch 37, i.e. need not be provided as a separate diode.

The switch arrangement in FIG. 3 furthermore comprises a high-side driver 34 driving high-side power switch 36 and a low-side driver 39 driving low-side power switch 37. A node between high-side power switch 36 and low-side power switch 37 provides a voltage VBCK. Furthermore, the switch arrangement comprises a switch controller including a sawtooth generator 30 and a comparator 33. Sawtooth generator 30 is powered by battery voltage VBAT and clocked by a clock signal CLK and provides a periodic sawtooth signal (ramped signal) to a positive (non-inverting) input of comparator 33. A negative (inverting) input of comparator 33 receives a signal from a feedback path, as will be described further below. Based on this, comparator 33 outputs a pulse width modulated signal PWM to high-side driver 34 and low-side driver 39, a pulse width depending on the feedback voltage and therefore on a current output voltage VOUT. The frequency of the pulse width modulated signal PWM corresponds to the frequency of the sawtooth signal provided by sawtooth generator 30 and has a constant frequency in the embodiment of FIG. 3.

Coupled between the node 311 between high-side power switch 36 and low-side power switch 37 and output terminal 312 is an inductor L, and a capacitor $C_{OUT}$ is coupled between terminal 312 and ground. $R_{C_{OUT}}$ denotes an (inherent) resistance of capacitor $C_{OUT}$, also referred to as equivalent series resistance, and $R_L$ represents the load of the buck converter modelled as a resistor. Inductor L may be essentially regarded as an ideal inductor and capacitor $C_{OUT}$ may be regarded as an ideal capacitor in FIG. 3.

To provide feedback, the voltage VOUT at output terminal 312 is provided to a resistive divider 310 comprising resistors $R_1$, $R_2$. A node between resistors $R_1$, $R_2$ is coupled to an inverting input of an error amplifier 32, symbolized by a difference amplifier 31 in FIG. 3. A non-inverting input of error amplifier 32 is provided with a reference voltage Vref. The output signal of error amplifier 31 therefore reflects a difference between the reference voltage Vref and the output voltage VOUT divided by the ratio of resistors $R_1$ and $R_2$. In this way, the output voltage VOUT is regulated to Vref·$(R_1+R_2)/R_2$. In other embodiments, resistive divider 310 may be omitted, such that VOUT is regulated to Vref.

In resistive divider 310, $C_{PAR}$ denotes a parasitic capacitance to ground, and $C_Z$ indicates a capacitor coupled in parallel to resistor $R_1$ as shown. In embodiments, $C_Z$ essentially acts as a high frequency bypass for $R_1$ (as capacitors have reduced impedance for higher frequency), which may decrease the response time in case of large stimuli.

A current limiter 35 is provided to prevent overcurrent and may be designed in a conventional manner.

Properties of the buck converter of FIG. 3 will now be explained in more detail referring to FIG. 4.

Figure 4:
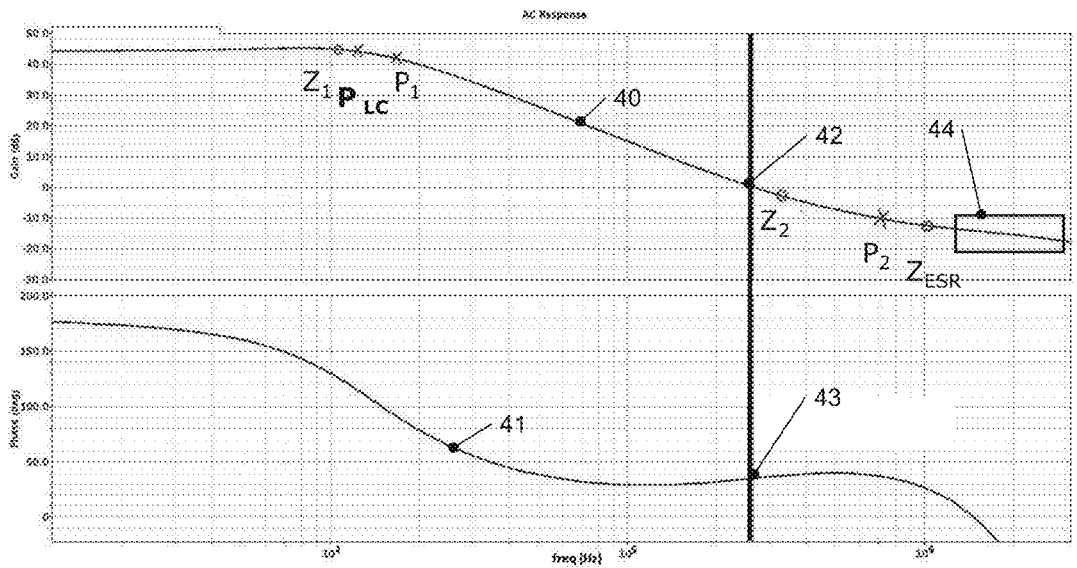
FIG. 4 is a diagram illustrating an open loop gain and a phase of a regulated buck voltage converter according to an embodiment.

FIG. 4 is a graph in which a curve 40 illustrates an example open loop gain in dB over logarithmic frequency and a curve 41 illustrates an example phase shift over logarithmic frequency for a buck converter like the buck converter of FIG. 3. It should be noted that curves 40, 41 merely serve as examples, and the exact form of curves 40, 41 may vary depending on the specific implementation.

In FIG. 4, a line 42 marks a frequency where curve 40 (i.e. the open loop gain) crosses 0 dB, also referred to as 0 dB crossing.

$P_{LC}$ marks the frequency position of the dominant pole, which is introduced by the LC network formed by inductor L and capacitor $C_{OUT}$ in FIG. 3. As explained, in embodiments $P_{LC}$ is the dominant pole, i.e. is the pole having the lowest frequency of all poles. $P_{LC}$ is a double complex conjugate pole. A phase decrease caused by pole $P_{LC}$ is mitigated by zeros $Z_2$, $Z_{ESR}$ to a phase margin between 40 and 60 degrees in some embodiments. This phase margin is the phase indicated by curve 41 at the 0 dB crossing 42, as indicated by numeral 43 in FIG. 4. Pole $Z_2$ is introduced in some embodiments by designing error amplifier 32 accordingly, in particular as having a high pass characteristic. To mitigate the phase decrease by $P_{LC}$, in embodiments $Z_2$ has a frequency near the 0 dB crossing 42, for example between 1/10 the 0 dB crossing frequency and 10 times the 0 dB crossing frequency. $P_2$ is a pole associated with zero $Z_2$, which in some embodiments may also be introduced by designing error amplifier 32 with high pass characteristics.

$Z_{ESR}$ is pole introduced by the equivalent series resistance (ESR), $R_{D_{OUT}}$ of capacitor $C_{OUT}$. While $Z_{ESR}$ contributes to increasing the phase margin, it should be noted that in embodiments, stable operation is possible even for very low values of $R_{C_{OUT}}$ in the milliOhm range, which is typical for high quality multilayer ceramic capacitors usable as capacitor $C_{OUT}$.

$Z_1$ is a zero and $P_1$ is a pole introduced by resistive divider 310. In embodiments, the divider ratio determined by $R_1$ and $R_2$ is low, and $Z_1$ and $P_1$ are comparatively close to each other, for example within a factor of 10. In any case, $Z_1$ compensates phase decreasing effects of $P_1$, such that $P_1$ may also be referred to as a compensated pole. The presence of parasitic capacitance of $C_{PAR}$ reduces effects of $Z_1$ regarding mitigation of phase decrease. In general, in embodiments, further poles indicated by 44 may be present. Further poles in embodiments may be either above the 0 dB crossing frequency 42, in which case they essentially do not influence stability of the buck converter, or may be compensated poles, where the phase decreasing of the pole is compensated by an associated zero, as is the case for $Z_1$ and $P_1$. In such compensated poles below the 0 dB crossing frequency, the associated zero is also below the 0 dB crossing frequency 42.

In embodiments, $P_2$ is at a higher frequency than $Z_2$, in particular at a frequency at least a factor of 5 higher or at least a factor of 10 higher than the frequency of $Z_2$. This may improve the increase of the phase margin by $Z_2$ in some embodiments. In particular, if $P_2$ is at a significantly higher frequency that $Z_2$ and therefore further away from the 0 dB crossing frequency and therefore does not significantly reduce the increase of the phase margin close to the 0 dB crossing by $Z_2$.

With an implementation as illustrated in FIGS. 3 and 4, a fast feedback loop may be implemented compared to conventional voltage mode buck converters where poles are provided at lower frequency than the frequency of $P_{LC}$, for example by designing an error amplifier with a low pass characteristic. Therefore, in conventional solutions, the dominant pole is at lower frequency, which corresponds to an artificial reduction of the bandwidth of the feedback loop and therefore increases response time.

Next, positions of poles and zeroes in FIG. 4 will be discussed in more detail. The angular frequency $\omega_{Z_1}$ of zero $Z_1$ and the angular frequency of $\omega_{P_1}$ of pole $P_1$ are given by $$\omega_{Z_1} = \frac{1}{(R_1 C_Z)}, \text{ and}$$

$$\omega_{P_1} = \frac{1}{(R_1 \| R_2) C_Z},$$

where $R_1 \| R_2$ is the resistance of the parallel circuit of $R_1$ with a parasitic resistance of $C_Z$.

The angular frequency $\omega_{Z_{ESR}}$ of the zero $Z_{ESR}$ is at $$\omega_{Z_{ESR}} = \frac{1}{(R_{C_{OUT}} \cdot C_{OUT})}.$$

Furthermore, as already mentioned the angular frequency $\omega_{P_{LC}}$ of dominant pole $P_{LC}$ is at $$\frac{1}{\sqrt{LC_{OUT}}}.$$

The position of $Z_2$ and $P_2$ depends on the particular implementation, for example of error amplifier 32, and will now be discussed using a specific example referring to FIG. 5.

Figure 5:
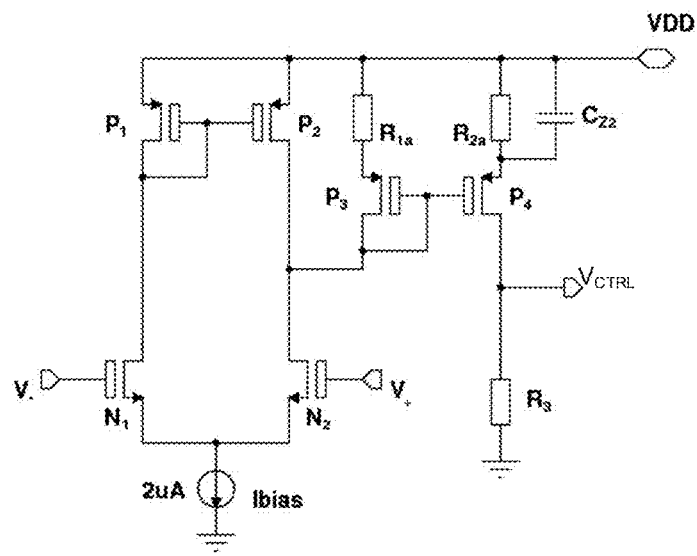
FIG. 5 illustrates a circuit diagram of an error amplifier usable in some embodiments.

FIG. 5 illustrates an example implementation of an error amplifier like error amplifier 32 of FIG. 3 usable in embodiments of buck converters to place a zero and associated pole ($Z_2$ and $P_2$ in FIG. 4) accordingly.

The error amplifier of FIG. 5 receives its input signals at a differential pair of NMOS transistors $N_1$, $N_2$. In the example of FIG. 5, a gate terminal of transistor $N_1$ serves as an inverting input receiving an input signal $V_-$ (for example from resistive divider 310 in FIG. 3), and a gate terminal of transistor $N_2$ serves as a non-inverting input receiving an input signal $V_+$ (for example Vref in FIG. 3). Differential pair $N_1$, $N_2$ is coupled to a current mirror formed by PMOS transistors $P_1$, $P_2$ coupled between VDD and transistors $N_1$, $N_2$ as shown. A bias current $I_{bias}$ for example of about 2 microamperes, is provided to differential pair $N_1$, $N_2$.

A source degenerated current mirror comprising PMOS transistors $P_3$ and $P_4$ is coupled to a node between transistors $N_2$ and $P_2$. A source generated current mirror is a current mirror where source terminals of the transistors (PMOS transistors $P_3$, $P_4$) are not directly coupled to an internal supply voltage (VDD in FIG. 5), but via resistors. VDD in some implementations may be generated by an on-chip voltage regulator used to supply various circuits on a chip, including the regulated buck voltage converter discussed here. In this case, a source terminal of transistor $P_3$ is coupled to VDD via a resistor $R_{1a}$, and a source terminal of transistor $P_4$ is coupled to VDD via a parallel circuit of a resistor $R_{2a}$ and a capacitor $C_{Z2}$.

An output terminal outputting an output voltage $V_{CTRL}$ (for example to comparator 33 of FIG. 3) is coupled between a drain terminal of transistor $P_4$ and a resistor $R_3$. In embodiments, resistance values of resistors $R_{1a}$ and $R_{2a}$ have a ratio unequal to 1, for example a ratio of 4:1, but not limited thereto, and transistor width of transistors $P_3$ and $P_4$ may also have a ratio unequal to 1, for example the inverse ratio of transistors $R_{1a}$ and $R_{2a}$, for example 1:4.

The error amplifier of FIG. 5 may be implemented using medium voltage analog transistors designed for an operation voltage of 5 Volt and with about 7.5 Nanometers gate oxide, but not limited thereto, which kind of design contribute to shifting parasitic poles to high frequencies (for example to box 44 of FIG. 4).

The error amplifier of FIG. 5 may be described by its transfer function H(s) in the s-plane according to $$H(s) = g_{m_{N_1,N_2}} R_3 \frac{\left(\frac{g_{m_{P_4}}}{g_{m_{P_3}}} + g_{m_{P_4}} R_{1a}\right)(1 + sC_{Z_2} R_{2a})}{1 + g_{m_{P_4}} R_{2a} + sC_{Z_2} R_{2a}},$$

where $g_m$ is the transconductance of the respective transistor indicated ($N_1$, $N_2$, $P_3$, $P_4$).

Based on this, the angular frequency $\omega_{Z_2}$ of zero $Z_2$ of FIG. 4 for the implementation of the error amplifier of FIG. 5 is given by $$\omega_{Z_2} = \frac{1}{R_{2a} C_{Z_2}},$$

and the angular frequency $\omega_{P_2}$ of pole $P_2$ associated with zero $Z_2$ is given by $$\omega_{P_2} = \frac{1 + g_{m_{P_4}} R_{2a}}{R_{2a} C_{Z_2}}.$$

In embodiments, $\omega_{Z_2}$ and $\omega_{P_2}$ differ from each other by a decade (factor 10) or less. For a larger frequency difference, a large value for $g_{m_{P4}}$ would be needed, which in turn would lower the frequency of a pole associated with the current mirror $P_3$, $P_4$ and thus may lead to an undesired pole in some implementations. In embodiments, therefore, the values are selected such that $Z_2$ is slightly above the 0 dB crossing, and $P_2$ is well above 0 dB crossing so essentially does not influence the phase margin at 43 in FIG. 4.

Operation of the error amplifier of FIG. 5 will now be described in more detail. In the embodiment of FIG. 5, a difference in drain currents generated by the differential pair $N_1$, $N_2$ is injected into the source degenerated current mirror implemented by $P_3$, $P_4$ and is multiplied by the current mirror ratio which is given by $W_{P_4}:W_{P_3}$, $W_{P_4}$ being the channel width of transistor $P_4$ and $W_{P_3}$ being the channel width of transistor $P_3$. In this equation, it is assumed that both transistors $P_3$, $P_4$ have a same channel length. The drain current of $P_4$ multiplied by the value R3 gives the output voltage of the $V_{CTRL}$ of the error amplifier. Therefore, for a given size of the differential pair of $N_1$, $N_2$, a voltage gain of the error amplifier of FIG. 5 may be adjusted by designing the mirror ratio of current mirror $P_3$, $P_4$ accordingly and by selecting the resistance of resistor $R_3$ accordingly.

Resistor R2a used for coupling the source of transistor P4 to VDD (i.e. for source degeneration of transistor P2) as well as the capacitance of capacitor $C_{Z_2}$ are chosen to set the position of zero Z2 at a desired location, for example slightly above zero crossing 42 in the example of FIG. 4, according to the above equations. Once the value of R2a has been selected, the value of R1a is also determined by using the inverse ratio of the respective transistor as explained above (i.e. $R_{1a}=(W_{P_4}/W_{P_3})R_{2a}$) in order to maintain the chosen current mirror ratio the current mirror would have without the degeneration.

Resistors R2a, R3 and capacitor CZ2 may be designed to deliver the desired performance regarding gain of the error amplifier and position of $\omega_{Z_2}$ with a minimum impact in required chip area. The frequency position of Z2 is determined by the product between R2a and CZ2 as per the above equation. When technologies with a relatively better capacitance per unit area is used for implementation (i.e. where less chip area is needed to implement a capacitor with a certain capacitance) embodiments may use a comparatively larger value for CZ2 (CZ2 is still acceptable in terms of area) and a smaller value for R2a. A smaller value for R2a implies a smaller value for R3. On the contrary, when technologies with relatively poorer capacitance per unit area are used, in embodiments comparatively higher values for the resistors may be selected while reducing the capacitance value CZ2 to limit the area requirement. Both variants are possible since the frequency position of Z2 is determined by the product between R2a and CZ2.

Figure 6:
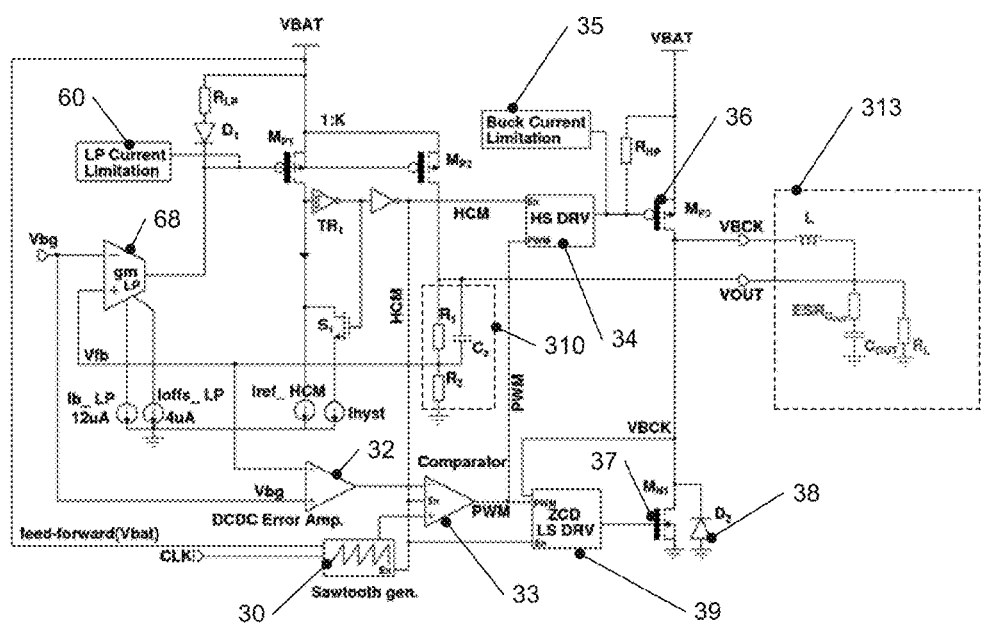
FIG. 6 is a diagram illustrating a regulated buck voltage converter together with a further voltage converter according to an embodiment.

Buck converters as discussed herein may be combined with further voltage converters to provide output voltages and currents for different current level. FIG. 6 illustrates an example where a buck converter similar to the implementation of FIG. 3 is combined with a low dropout regulator (LDO). In FIG. 6, elements of a buck converter corresponding to elements already discussed with reference to FIG. 3 bear the same reference numerals and will not be discussed again in detail apart from some implementation differences discussed below.

Figure 7:
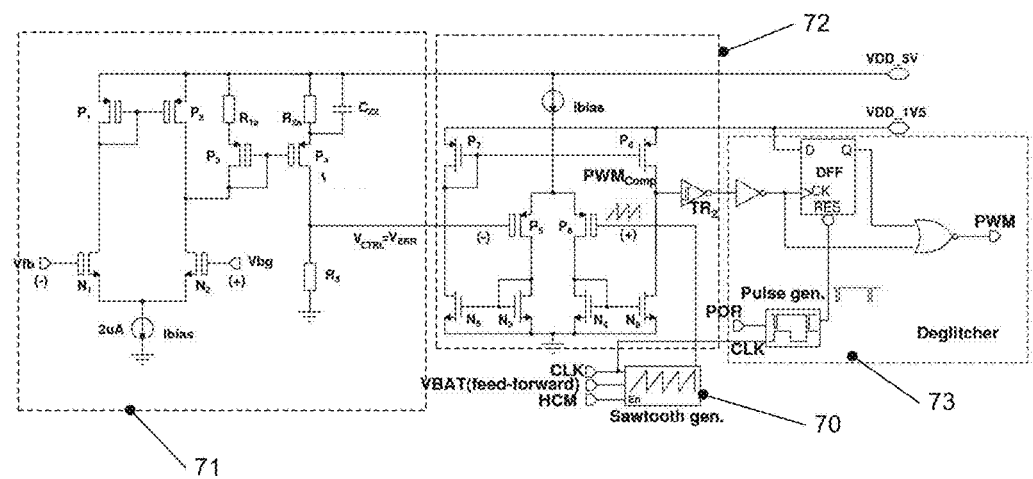
FIG. 7 is a circuit diagram illustrating elements of a regulated buck voltage converter according to an embodiment.

For example, a comparator 33 of FIG. 7 essentially corresponds to comparator 33 of FIG. 3. Additionally, comparator 33 of FIG. 7 has an enable input En which enables the comparator when the buck converter is to be active, for example for output loads above a predefined threshold. When comparator 33 of FIG. 7 is enabled, the buck converter operates as explained with reference to FIGS. 1 to 5.

The remaining elements of FIG. 6 implement a conventional LDO which is operable for low output loads, for example output loads below a threshold, as well as switching circuitry to enable and disable the buck converter. The implementation of FIG. 6 takes advantage of the fact that at low load current levels in the Milliampere range, the power efficiency of an LDO is similar to that of a buck converter operating in a pulse frequency modulation or burst mode. When the load current output is below a predefined threshold (high current mode rising threshold in FIG. 6), only the low power LDO is active, and comparator 33 is disabled by a signal HCM. Likewise, also sawtooth generator 39, high-side driver 34 and low-side driver 37 are disabled via respective enable inputs. If the load current reaches or exceeds the threshold, signal HCM is set to high, this enabling the buck converter.

In the implementation of FIG. 6, the LDO is not turned off when the load current exceeds the threshold, although in other implementations this may be the case. Therefore, the LDO then still provides a small fraction of the total load current even if the buck regulator is on. The switch on/switch off behavior via the signal HCM in implementation is done rapidly, so as not to affect the dynamic performance of the regulator.

An error amplifier for the LDO comprises an operational transconductance amplifier 68 biased by a current source $I_{b\_LP}$ that generates a current proportional to the difference between a feedback signal from voltage $V_{fb}$ from voltage divider 310 and a reference voltage, which in the implementation of FIG. 6 is a bandgap voltage $V_{bg}$. Bandgap voltage $V_{bg}$ may be generated on the same chip on which the circuit shown in FIG. 6 is implemented. This current is injected into a nonlinear current mirror formed by a resistor $R_{LP}$ and a diode $D_1$ together with a pass device $M_{P2}$. Transistor $M_{P1}$ is a K:1 replica of pass device $M_{P2}$ (also referred to as KILIS=K $I_{load}\,I_{sense}$) and is used for load current sensing. Additional conventional circuitry may also be used.

The LDO has current limitation circuitry 60 which may be implemented as a gate source voltage clamp of transistor $M_{P1}$ as shown. For example, as current limitation threshold twice the above-mentioned threshold for switching the buck converter may be used.

Transistor $M_{P1}$ and transistor $S_1$, current source Iref_HCM providing a threshold current and Ihyst providing a hysteresis current together with a Schmitt trigger $TR_1$ form a high current mode comparator which controls the switching of the buck converter on and off depending on load current. The hysteresis current Ihyst provides a hysteresis for the threshold to avoid rapid toggling when the load current is at or near the threshold. The thresholds therefore are programmed by using the reference current values Iref_HCM and the ratio K.

To avoid oscillations, the LDO and the buck converter in some implementations are set to regulate at slightly different voltages. An intended artificial offset (some 10 Millivolt for example) is introduced for the low power error amplifier 68 such that the LDO has a higher voltage regulation point than the buck converter. This ensures that around switching points the buck converters contribution to the load current is very close to zero, switching point being the point where the buck converter is activated or deactivated. This may in some implementations contribute to prevent continuous oscillations between switching the buck converter on and off.

This offset may be implemented by supplying the current Ioff_LP to transconductance amplifier 68 in some embodiment.

FIG. 7 illustrates a circuit diagram of a part of a buck converter according to an embodiment, in particular an error amplifier together with comparator and a following deglitcher.

In the embodiment of FIG. 7, an error amplifier 71 is implemented as discussed with FIG. 5 and may be used to implement error amplifier 32 of FIG. 3. A block 72 illustrates an example implementation of a comparator like comparator 33 of FIG. 3. Numeral 70 indicates a sawtooth generator, for example sawtooth generator 30 of FIG. 3. Deglitcher 73 then finally generates the pulse width modulated output signal based on the output of the comparator and may be implemented as in conventional buck converter circuits. With the comparator 72 comprising an input differential pair $P_5$, $P_6$ which may be implemented in a comparatively high voltage technology (for example 5 Volt), whereas the remaining transistors may be implemented with low voltage technology (for example 1.5 Volt with 2 Nanometer gate oxides) in order to improve switching speed and minimize propagation delay in some embodiments.

In particular, a clock derived pulse generator shown resets the D-flipflop DFF at the beginning of each clock cycle. If the error voltage output by error amplifier 71 is greater than zero, at the beginning of a new period, when the ramp signal of sawtooth generator 70 is also zero, the output of the comparator will be zero and the value of the PWM signal will be a logical one (high). The comparator will switch when an instantaneous value of the ramp signal of sawtooth generator 70 is equal to the error voltage output by error amplifier 71, generating a high-to-low transition of the PWM signal. As shown, the pulse generator and the sawtooth generator are clocked by the same clock signal CLK, such that a rise time of the ramp generator waveform is almost equal to the clock period. Therefore, the comparator translates the error information from the voltage domain into the time domain by generating a PWM signal having a frequency corresponding to the frequency of clock signal CLK and a duty cycle proportional to the value of the error voltage output by error amplifier 71.

The edges of the comparator output waveform in the embodiment of FIG. 7 are "sharpened" by an inverting Schmitt trigger $TR_2$, and the resulting signal is buffered with an additional inverter.

The deglitcher circuit formed by D-flipflop DFF, a NOR gate and the pulse generator in embodiments eliminates additional transitions of the PWM signal which may be due to switching noise especially at low output inductor values (low values of inductor L of FIG. 3) for example. In an embodiment, $P_5$ has a higher width than P6, to account for the asymmetry caused by the ramp voltage of sawtooth generator 70 starting at ground level. This has the effect of making the signal PWM low and keeping it low as both inputs of the comparator are equal and low.

It should be noted that FIG. 7 merely gives an implementation example of comparator and deglitcher, and other comparator designs may also be used.

Figure 8:
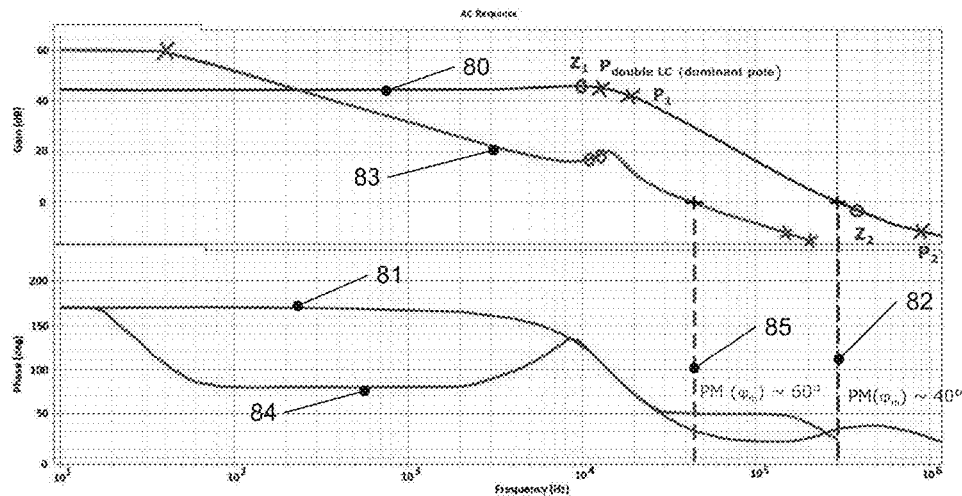
FIG. 8 is a diagram illustrating an open loop gain and a phase of a regulated buck voltage converter according to an embodiment with a conventional converter.

FIG. 8 illustrates a comparison of a buck converter implemented based on techniques disclosed herein, with a dominant pole introduced by an LC network at an output of the buck converter as discussed, with a conventional buck converter circuit. Curves 80 to 81 of FIG. 8 essentially correspond to curves 40, 41 of FIG. 4, with some of the poles being omitted. The 0 dB crossings are marked with reference numerals 82 and 85, respectively. Curve 83 corresponds to an example gain curve for a conventional voltage mode buck converter, and curve 84 corresponds to a corresponding phase curve. As can be seen, in the buck converter as discussed herein, the phase margin is about 30 degrees by virtue of the additional zero $Z_2$, and a high bandwidth with a good transient response and good dynamic regulation performance, in particular for load jumps over several orders of magnitudes may be obtained. In contrast thereto, in the conventional case, the bandwidth is limited, with a phase margin at 0 dB crossing 85 of about 60 degrees.

Figure 9A:
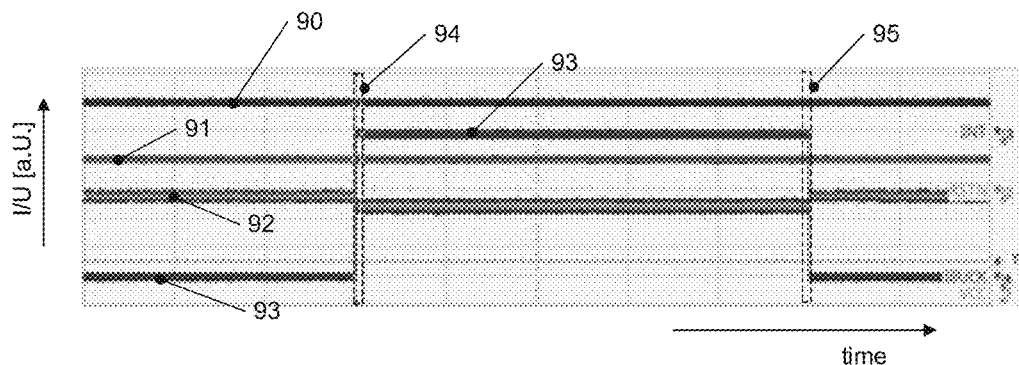
FIGS. 9A to 9C illustrate measurement results for a regulated buck voltage converter according to an embodiment.
Figure 9B:
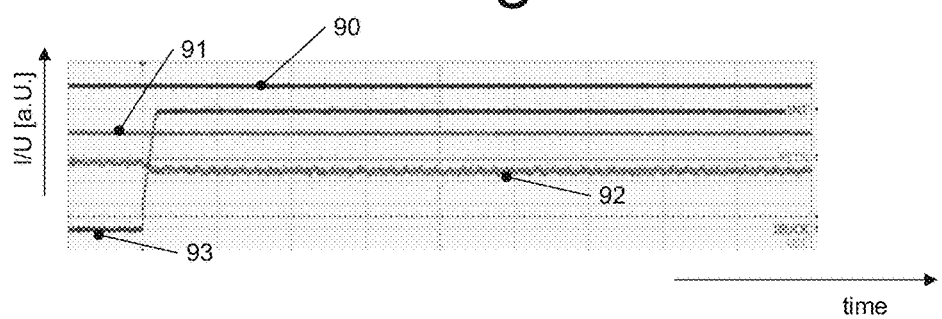
Figure 9C:
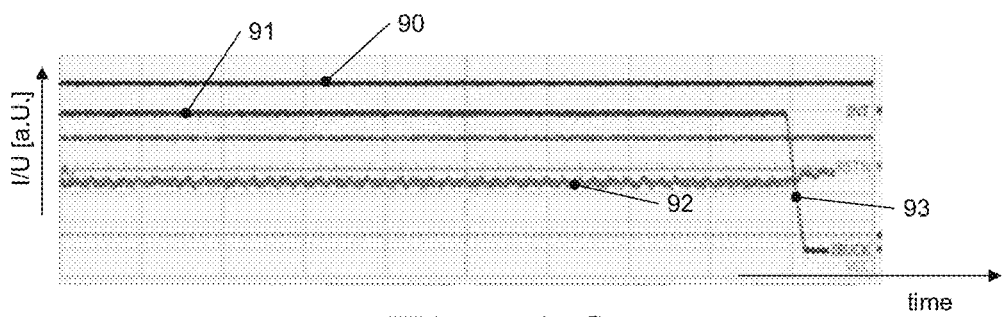

FIGS. 9A to 9C illustrate measurement results for a buck converter implemented according to an embodiment, for example implemented as discussed with reference to FIGS. 3 to 5. FIG. 9A illustrates various voltages and currents in the buck converter over time. FIG. 9B illustrates a magnified version of a portion 94 of FIG. 9A, and FIG. 9C illustrates a magnified version of a portion 95 in FIG. 9A.

A curve 93 illustrates the load current in the measurement, and a curve 92 illustrates the output voltage. Curve 90 illustrates an interrupt signal of a system in which the buck converter is integrated, and curve 91 illustrates a reset signal of the system in which the buck converter is integrated. In area portions 94 and 95, load jumps occur, from low load to high load (zero Milliamperes to 500 Milliamperes) in portion 94 and from 500 Milliamperes to zero Milliamperes in portion 95. As can be seen by examining curve 92, a very fast regulation of the output voltage occurs, with a response time smaller than 5 microseconds including a handover mechanism from an LDO to a buck regulator as discussed with reference to FIG. 6.

Figure 10:
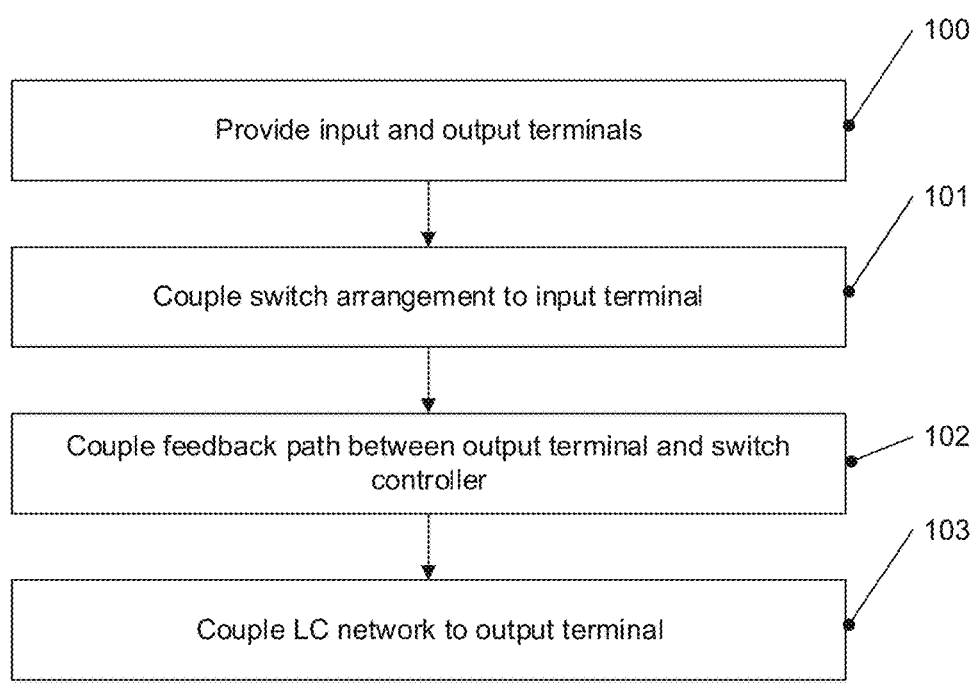
FIG. 10 is a flow chart illustrating a method for providing a regulated buck voltage converter according to an embodiment.

FIG. 10 is a flow chart illustrating a method for manufacturing a buck converter as discussed herein. In particular, the method of FIG. 10 may be used to provide any of the buck converter circuits discussed previously, and additional features, variations, modifications and details discussed with reference to FIGS. 1 to 9 may also be applied to the method of FIG. 10.

At 100 in FIG. 10, the method comprises providing input and output terminals for inputting a voltage and outputting a regulated voltage. At 101, the method comprises coupling a switch arrangement to the input terminal, for example a high-side power switch and a low-side power switch as discussed. At 102, the method comprises coupling a feedback path between the output terminal and a switch controller of the switch arrangement, for example a feedback path comprising an error amplifier with a high pass characteristic. At 103, the method comprises coupling an LC network to the output terminal, for example LC network 313 of FIG. 3. The LC network introduces a dominant pole in an open loop transfer function of the buck converter thus manufactured. It should be noted that the various acts or events 100 to 103 need not be performed in the order shown, but different orders or simultaneous implementations of various acts or events may also be used, depending on manufacturing techniques used.

Some non-limiting embodiments are provided according to the following examples:

Example 1

A buck voltage converter, comprising:
a voltage input terminal,
a voltage output terminal,
a switch arrangement coupled to the voltage input terminal, the switch arrangement comprising a switch controller,
a feedback loop coupled between the voltage output terminal and the switch controller, and
a network comprising an inductor and a capacitor coupled to the voltage output terminal,
wherein the buck voltage converter is configured so that a dominant pole of an open loop transfer function of the buck voltage converter is a pole introduced by the network.

Example 2

The buck voltage converter of example 1, wherein the dominant pole is a double complex conjugate pole introduced by the network.

Example 3

The buck voltage converter of example 1 or 2, wherein the open loop transfer function further comprises at least one further zero in addition to a zero associated with the network to reduce a phase decrease caused by the dominant pole.

Example 4

The buck voltage converter of example 3, wherein the feedback loop comprises an error amplifier having a high pass filter characteristic, wherein the at least one further zero is introduced by the error amplifier.

Example 5

The buck voltage converter of example 4, wherein the error amplifier comprises a differential input transistor pair, a first current mirror coupled to the differential input transistor pair and a second current mirror coupled to a node between the differential input transistor pair and the first current mirror, wherein the second current mirror is a source degenerated current mirror.

Example 6

The buck voltage converter of any one of examples 1-5, wherein, apart from the dominant pole, each pole of the open loop transfer function having a frequency below a 0 dB crossing frequency of the open loop gain of the buck voltage converter has an associated zero having a frequency below the 0 dB crossing frequency of the open loop gain.

Example 7

The buck voltage converter of any one of examples 1-6, wherein the switch controller is configured to control the switch arrangement based on a constant frequency pulse width modulation scheme.

Example 8

The buck voltage converter of any one of examples 1-7, wherein the buck voltage converter is configured to operate in a voltage mode.

Example 9

A buck voltage converter, comprising:
a voltage input terminal,
a voltage output terminal,
a voltage converter circuit coupled between the voltage input terminal and the voltage output terminal, wherein the voltage converter circuit comprises:
a switch arrangement, and
an error amplifier having a high pass filter characteristic, wherein a first input of the error amplifier is configured to be coupled to a reference voltage, wherein a second input of the error amplifier is coupled to the voltage output terminal, and wherein an output of the error amplifier is coupled to the switch arrangement; and
a network comprising a capacitor and an inductor coupled to the voltage output terminal.

Example 10

The buck voltage converter of example 9, wherein the high pass filter characteristic of the error amplifier causes at least one zero of an open loop transfer function of the buck voltage converter to at least partially compensate a phase shift by a pole of the open loop transfer function introduced by the network.

Example 11

The buck voltage converter of example 10, wherein the pole introduced by the network is a dominant pole of the open loop transfer function.

Example 12

The buck voltage converter of any one of examples 9-11, further comprising a resistive divider coupled between the voltage output terminal and the second input of the error amplifier, and a capacitor coupled in parallel to at least one resistor of the resistive divider.

Example 13

The buck voltage converter of example 12, wherein the resistive divider is configured to introduce a pole and a zero in an open loop transfer function of the buck voltage converter below the zero dB crossing frequency of the open loop gain.

Example 14

The buck voltage converter of any one of examples 9-13, wherein the switch arrangement comprises:
a comparator, wherein a first input of the comparator is coupled to the output of the error amplifier,
a signal generator circuit coupled to a second input of the comparator,
a high-side driver and a low-side driver, an input of the high-side driver and an input of the low-side driver being coupled to an output of the comparator,
a high-side switch coupled to the high-side driver, and
a low-side switch coupled to the low-side driver.

Example 15

The buck voltage converter of any one of examples 9-14, further comprising:
a further voltage converter circuit coupled between the voltage input terminal and the voltage output terminal, wherein the voltage converter circuit and the further voltage converter circuit have different efficiencies depending on an output load.

Example 16

The buck voltage converter of any one of examples 9-15, wherein the error amplifier comprises a differential input transistor pair, a first current mirror coupled to the differential input transistor pair and a second current mirror coupled to a node between the differential input transistor pair and the first current mirror, wherein the second current mirror is a source degenerated current mirror.

Example 17

A method, comprising:
providing a voltage input terminal,
providing a voltage output terminal,
providing a switch arrangement between the voltage input terminal and the voltage output terminal,
coupling a network including an inductor and a capacitor to the voltage output terminal,
providing a feedback loop between the voltage output terminal and a switch controller of the switch arrangement, and
configuring a buck voltage converter including the switch arrangement, the network and the feedback loop such that a dominant pole of an open loop transfer function of the buck voltage converter is introduced by the network.

Example 18

The method of example 17, wherein providing the feedback loop comprises providing an error amplifier having a high pass filter characteristic.

Example 19

The method of example 17 or 18, wherein providing the feedback loop comprises providing a capacitor coupled in parallel to at least one resistor of a resistive divider.

Example 20

The method of any one of examples 17-19, wherein, apart from the dominant pole, each pole of the open loop transfer function having a frequency below a 0 dB crossing frequency of the open loop gain of the buck voltage converter has an associated zero having a frequency below the 0 dB crossing frequency of the open loop gain.

In view of the variations and modifications discussed above, the embodiments shown are not to be construed as limiting.

What is claimed is:

1. A buck voltage converter, comprising:
   a voltage input terminal,
   a voltage output terminal,
   a switch arrangement coupled to the voltage input terminal, the switch arrangement comprising a switch controller,
   a feedback loop coupled between the voltage output terminal and the switch controller, and
   a network comprising an inductor and a capacitor coupled to the voltage output terminal,
   wherein the buck voltage converter is configured so that a dominant pole of an open loop transfer function of the buck voltage converter is a pole introduced by the network and wherein, apart from the dominant pole, each pole of the open loop transfer function having a frequency below a 0 dB crossing frequency of an open loop gain of the buck voltage converter has an associated zero having a frequency below the 0 dB crossing frequency of the open loop gain.

2. The buck voltage converter of claim 1, wherein the dominant pole is a double complex conjugate pole introduced by the network.

3. The buck voltage converter of claim 1, wherein the open loop transfer function further comprises at least one further zero in addition to a zero associated with the network to reduce a phase decrease caused by the dominant pole.

4. The buck voltage converter of claim 3, wherein the feedback loop comprises an error amplifier having a high pass filter characteristic, wherein the at least one further zero is introduced by the error amplifier.

5. The buck voltage converter of claim 4, wherein the error amplifier comprises a differential input transistor pair, a first current mirror coupled to the differential input transistor pair and a second current mirror coupled to a node between the differential input transistor pair and the first current mirror, wherein the second current mirror is a source degenerated current mirror.

6. The buck voltage converter of claim 1, wherein the switch controller is configured to control the switch arrangement based on a constant frequency pulse width modulation scheme.

7. The buck voltage converter of claim 1, wherein the buck voltage converter is configured to operate in a voltage mode.

8. A buck voltage converter, comprising:
   a voltage input terminal,
   a voltage output terminal,
   a voltage converter circuit coupled between the voltage input terminal and the voltage output terminal, wherein the voltage converter circuit comprises:
   a switch arrangement;
   an error amplifier having a high pass filter characteristic, wherein a first input of the error amplifier is configured to be coupled to a reference voltage, wherein a second input of the error amplifier is coupled to the voltage output terminal, and wherein an output of the error amplifier is coupled to the switch arrangement; and
   a network comprising a capacitor and an inductor coupled to the voltage output terminal,
   wherein the high pass filter characteristic of the error amplifier causes at least one zero of an open loop transfer function of the buck voltage converter to at least partially compensate a phase shift by a pole of the open loop transfer function introduced by the network, wherein the pole introduced by the network is a dominant pole of the open loop transfer function, and wherein, apart from the dominant pole, each pole of the open loop transfer function having a frequency below a 0 dB crossing frequency of an open loop gain of the buck voltage converter has an associated zero having a frequency below the 0 dB crossing frequency of the open loop gain.

9. The buck voltage converter of claim 8, further comprising a resistive divider coupled between the voltage output terminal and the second input of the error amplifier, and a capacitor coupled in parallel to at least one resistor of the resistive divider.

10. The buck voltage converter of claim 9, wherein the resistive divider is configured to introduce a pole and a zero in an open loop transfer function of the buck voltage converter below the zero dB crossing frequency of the open loop gain.

11. The buck voltage converter of claim 8, wherein the switch arrangement comprises:
    a comparator, wherein a first input of the comparator is coupled to the output of the error amplifier,
    a signal generator circuit coupled to a second input of the comparator,
    a high-side driver and a low-side driver, an input of the high-side driver and an input of the low-side driver being coupled to an output of the comparator,
    a high-side switch coupled to the high-side driver, and
    a low-side switch coupled to the low-side driver.

12. The buck voltage converter of claim 8, further comprising:
    a further voltage converter circuit coupled between the voltage input terminal and the voltage output terminal, wherein the voltage converter circuit and the further voltage converter circuit have different efficiencies depending on an output load.

13. The buck voltage converter of claim 8, wherein the error amplifier comprises a differential input transistor pair, a first current mirror coupled to the differential input transistor pair and a second current mirror coupled to a node between the differential input transistor pair and the first current mirror, wherein the second current mirror is a source degenerated current mirror.

14. A method, comprising:
  providing a voltage input terminal,
  providing a voltage output terminal,
  providing a switch arrangement between the voltage input terminal and the voltage output terminal,
  coupling a network including an inductor and a capacitor to the voltage output terminal, providing a feedback loop between the voltage output terminal and a switch controller of the switch arrangement, and
  configuring a buck voltage converter including the switch arrangement, the network and the feedback loop such that a dominant pole of an open loop transfer function of the buck voltage converter is introduced by the network, wherein, apart from the dominant pole, each pole of the open loop transfer function having a frequency below a 0 dB crossing frequency of an open loop gain of the buck voltage converter has an associated zero having a frequency below the 0 dB crossing frequency of the open loop gain.

15. The method of claim 14,
  wherein providing the feedback loop comprises providing an error amplifier having a high pass filter characteristic.

16. The method of claim 14,
  wherein providing the feedback loop comprises providing a capacitor coupled in parallel to at least one resistor of a resistive divider.

* * * * *